United States Patent [19]

Goodfellow

[11] 4,076,565
[45] Feb. 28, 1978

[54] MANUFACTURE OF MOULDED ARTICLES

[75] Inventor: Anthony Gerald Goodfellow, Erdington, England

[73] Assignee: Dunlop Limited, England

[21] Appl. No.: 715,116

[22] Filed: Aug. 17, 1976

Related U.S. Application Data

[62] Division of Ser. No. 665,429, March 10, 1976, Pat. No. 4,006,053.

[30] Foreign Application Priority Data

Mar. 20, 1975 United Kingdom .............. 11567/75

[51] Int. Cl.² .......................................... B29H 17/00
[52] U.S. Cl. ................................... 156/125; 264/94; 264/248; 264/326; 264/328
[58] Field of Search .................. 156/125, 394, 110 R, 156/129, 145, 147, 156, 228, 292; 425/17, 32, 501, 507, 519, 520, 521, 324 R, 325, 326 R, 327, 328, 242 R; 264/93, 94, 96, 248, 316, 36, 326, 328–329

[56] References Cited

U.S. PATENT DOCUMENTS 3,825,457   7/1974   Holroyd et al. ................... 264/96 X Primary Examiner—Jan H. Silbaugh
Attorney, Agent, or Firm—Stevens, Davis, Miller & Mosher

[57] ABSTRACT

A method is provided whereby the three components (sidewalls and tread) of a pneumatic tire are moulded in a single press operation using two transfer units charged with uncured rubber which are located in the press so as to discharge to the mould cavities when the press is closed, after which the press is opened to allow removal of the transfer units, (the moulded components remaining in the press) and then reclosed to assemble the components together. Each transfer unit comprises at least one reservoir for uncured rubber defined between parts of the unit which are relatively movable under the action of the press to transfer the rubber from the reservoir(s) to associated mould cavities.

1 Claim, 14 Drawing Figures

MANUFACTURE OF MOULDED ARTICLES

This is a division of application Ser. No. 665,429, filed Mar. 10, 1976, now U.S. Pat. No. 4,006,053.

The present invention relates to an improved method and apparatus for moulding articles, such as pneumatic tires.

In accordance with one aspect of the present invention there is provided a method of producing a moulded article from a plurality of components, comprising locating in a press a transfer unit assembly incorporating mould surfaces which together with co-operating surfaces or die members of the press form mould cavities for the components, said transfer unit assembly having at least one transfer reservoir between relatively movable parts of the unit charged with mouldable material, closing the press to cause relative movement of said parts which will effect transfer of the material from the transfer reservoir or reservoirs to the cavities to form all of the said components in a single press operation, opening the press and removing the transfer unit assembly whilst leaving the moulded components on the die members and re-closing the press to bring the components supported on the die members into assembled relationship and to bond the components together.

In accordance with another aspect of the present invention there is provided a method of moulding a pneumatic tyre having sidewalls joined by a tread portion the method comprising:

locating at a filling station two transfer units, each unit comprising in its face remote from the other transfer unit a mould surface for one of the sidewalls, each unit comprising at least two parts relatively movable axially of the unit between an open position in which the volume of at least one reservoir for uncured rubber defined between said parts is relatively large and a closed position in which said volume is relatively small, and passageways means communicating the axially opposite faces of each unit with a reservoir thereof, charging the reservoirs of the transfer units with mouldable material at the filling station, opening a press so that sidewall die members thereof are relatively spaced, the faces of the sidewall die members presented toward one another comprising mould surfaces for the sidewalls and locking spue grooves adjacent the mould surfaces, locating the transfer units in the press so they are positioned between the sidewall die members with the sidewall mould surfaces of the transfer units presented towards the mould surfaces of the sidewall die members, closing the press whereby a mould cavity for the tread portion is defined between the transfer units and a mould cavity and locking spue groove for one of the sidewalls is defined between each sidewall die member and the mould surface of the adjacent transfer unit, each said cavity communicating with a passageway of at least one of the transfer units, applying pressure to the closed press relatively to move the parts of each transfer unit to the closed positions thereof whereby moulding material is transferred from the reservoirs to the cavities via the passageways, re-opening the press and removing the transfer units therefrom, the moulded tread portion remaining in the press and the moulded sidewalls being held on the respective sidewall die members by the moulded locking spues and re-closing the press to bring the moulded sidewalls, held by the locking spues, into contact with the moulded tread portion on opposite sides of the latter and bonding the sidewalls to the tread portion, the method additionally comprising subjecting the moulding components of the press to superatmospheric pressure during the moulding operation and subsequent bonding operation.

The pressurization serves to prevent gassing off from the warm compound after moulding and, particularly in moulding the sidewalls acts in conjunction with the locking spues to keep the moulded part in the correct part of the mould for the joining to be carried out. It will be noted that gassing off from the warm compound is particularly undesirable since it gives rise to ugly pitting of the surface of the moulded tire part and gives rise to porosity in the finished product which can lead to structural failure of the tire in use.

The rubber may be any elastomeric, cross-linkable polymeric material, for example natural rubber, butyl rubber, SBR, neoprene, ethylene-propylene rubber and nitrile rubber or mixtures thereof. The type of rubber used will of course depend on the desired properties of the finished tire and the selection and compounding of a suitable rubber for any particular purpose is a well-known procedure in the field of rubber technology.

Although the rubber is to be substantially uncured when used to form the parts of the tire, it is preferred to subject it to a certain amount of working prior to the forming steps in order to destroy its "nerve" or "memory". Suitable working may be, for example, by milling, extrusion or other mechanical or heat treatment but should not be sufficient to start the rubber on its curing cycle. In other words, although the rubber may have been subjected to a certain amount of energy, it is still substantially uncured when used to form the tire parts.

The press preferably comprises an intermediate die member adapted to provide a mould cavity for the tread portion and positioned between the sidewall die members in the press, the arrangement being such that in the operative positions of the transfer units each is located between the intermediate die member and a respective one of the sidewall die members. The intermediate die member preferably comprises at least two parts which are separable when the press is open to permit the introduction of a breaker structure into the mould cavity for the tread portion. In the moulding of the tread portion, the tread pattern will serve the same purpose as the locking spues on the sidewalls. Pressurization of the tread portion will maintain intimate contact between the tread and the tread pattern of the intermediate die member and will prevent gassing off from the warm tread rubber.

Each transfer unit preferably comprises three parts defining two reservoirs for moulding material, the reservoirs communicating respectively with the sidewall mould surface and the tread portion mould surface of the transfer unit. The transfer units are preferably removable from the press to filling positions at a filling station where means is provided for charging the reservoirs of the transfer units which mouldable material. This means is preferably adapted to introduce different mouldable materials into the two reservoirs of each transfer unit and may take the form of a single distribution member at the filling station capable of discharging to both transfer units when they are positioned on its opposite sides.

A preferred embodiment of the invention will now be described with reference to the accompanying drawings, in which.

Figure 1:
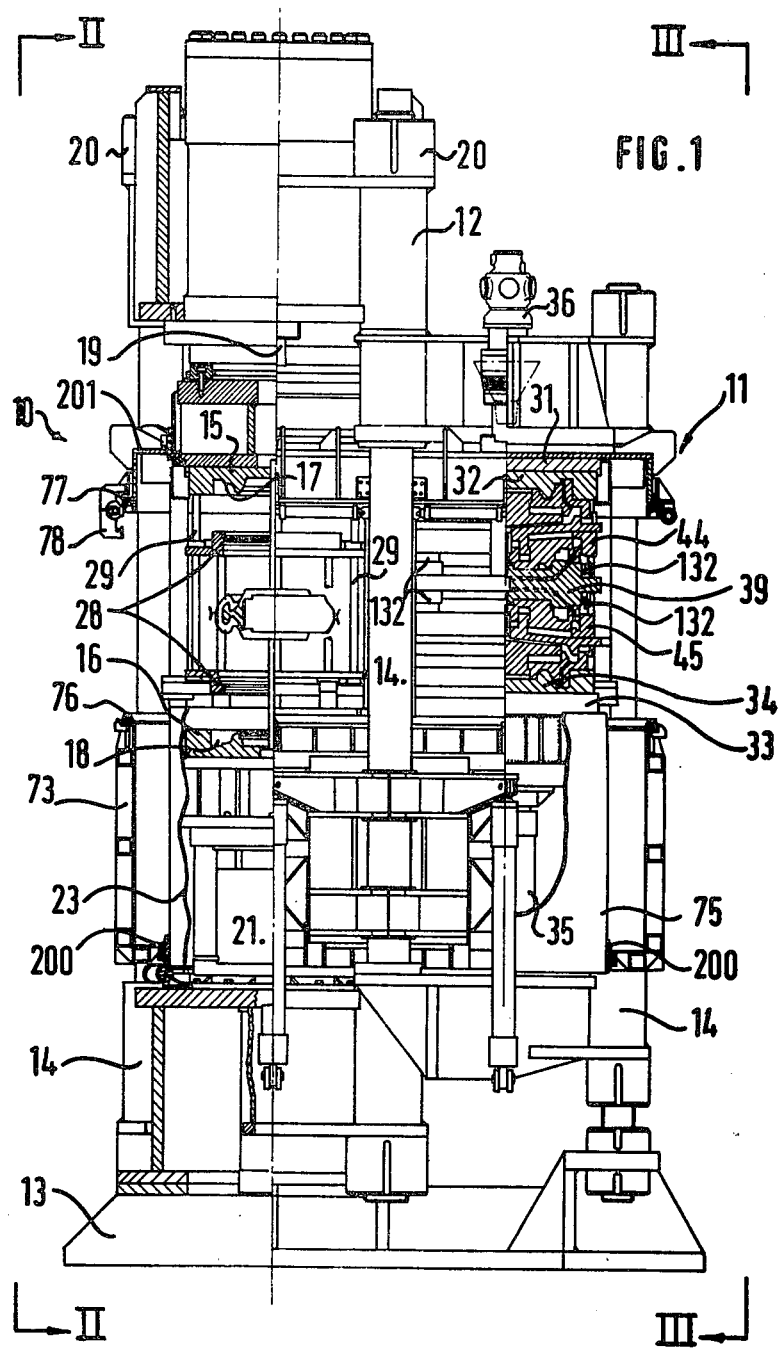
FIG. 1 is a front elevation, partly in section and with parts cut away, of apparatus for carrying out the method of the invention.

The machine illustrated comprises a main press 10 and a filling press 11 which are located in side-by-side relation between a common head bolster 12 and a common base 13 joined at the four corners of the machine and between the main and filling presses by six circular-section columns 14. The main press comprises an upper unit 15 and a lower unit 16 both guided for vertical movement toward and away from one another and having integral with their opposed faces respective sidewall mould parts 17 and 18. As described in the Assignee's U.S. Pat. No. 3,825,457 of July 23, 1974, the sidewall mould parts 17 and 18 have mould surfaces adjacent which are locking spue grooves (not shown) shaped to mould spues of the kind illustrated in FIG. 7.

Figure 7:
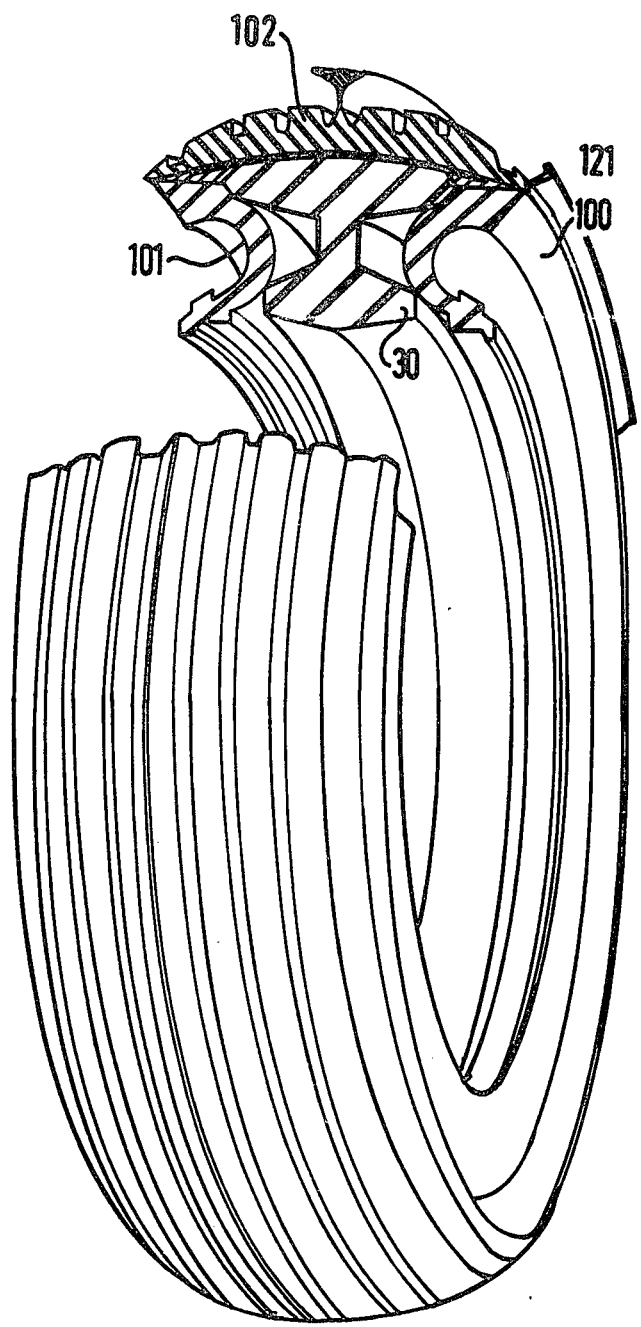
FIG. 7 illustrates the same former inside a finished tire manufactured by the apparatus of FIGS. 1 to 3, and FIGS. 8 to 14 schematically illustrate the machine of FIGS. 1 to 3 during the different stages of the manufacturing process.

In FIG. 7 a moulded tire part 100 is shown having a spue 121 on one of its sidewall portions. Spue 121 is so shaped that pressurized gas introduced into the mould will deflect over the spue and thereby will not get between the moulded part and the surface of the mould itself, i.e. the tendency for the gas to get between the exterior of the finished product of the moulded part and the surface of the mould itself is effectively reduced.

Figure 2:
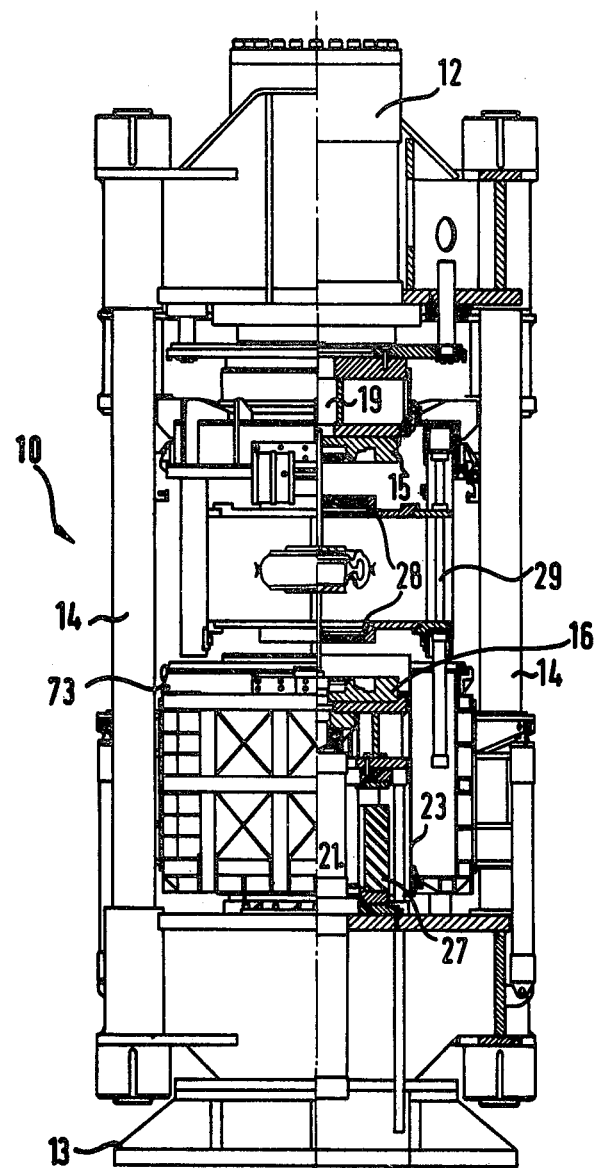
FIG. 2 is a side elevation partly in section of the apparatus of FIG. 1 viewed in the direction of arrows II—II.

The upper unit 15 is arranged to be driven downwardly by an hydraulic ram 19 and to be raised by pull back rams 20 while the lower unit 16 is arranged to be raised and lowered by a bottom hydraulic ram unit 21 (FIG. 2). In operation of the main press, most of the daylight is taken up by the relatively long stroke bottom ram 21, whereupon the bottom unit 16 is locked against downward movement by operation of the "dog-clutch" arrangement best illustrated in FIG. 5 and which is actuated by the hydraulic ram 22. The comparatively short-stroke main ram 19 is now operated to apply full press pressure. The lower unit 16 is surrounded by a pressure sealing skirt 23 and at its lower end has circumferentially spaced load blocks 24. When the circular-section unit 16 is raised by the ram 21 the load blocks 24 rise above a crown-shaped member 25 controlled by the ram 22. The member 25 consists of a circular base 26 on and rotatable relative to the base 13 and circumferentially separated upstanding teeth 27. After the unit 16 has been raised above the member 25 by the ram 21 the ram 22 is actuated to rotate the member 25 so that its teeth 27 come into alignment with the load blocks 24. In this position it is not possible for the unit 16 to descend because the load blocks 24 rest on the tops of the teeth 27. When it is desired to lower the unit 16 the load blocks 24 are first raised clear of the teeth 27 by the ram 21, the ram 22 is actuated to rotate the member 25 until each tooth 27 is between two of the load blocks 24 and thereafter the ram 21 can be actuated to cause the unit 16 to descend, the teeth 27 of the member 25 passing between adjacent load blocks 24. In this way the greater part of the daylight of the press is taken up by a prolonged movement of the unit 16 which is then locked and thereafter press pressure is applied by the short stroke ram 19 to the upper unit 15. When opening the main press the pull back rams 20 are used to displace the upper unit 15 upwardly.

Figure 6:
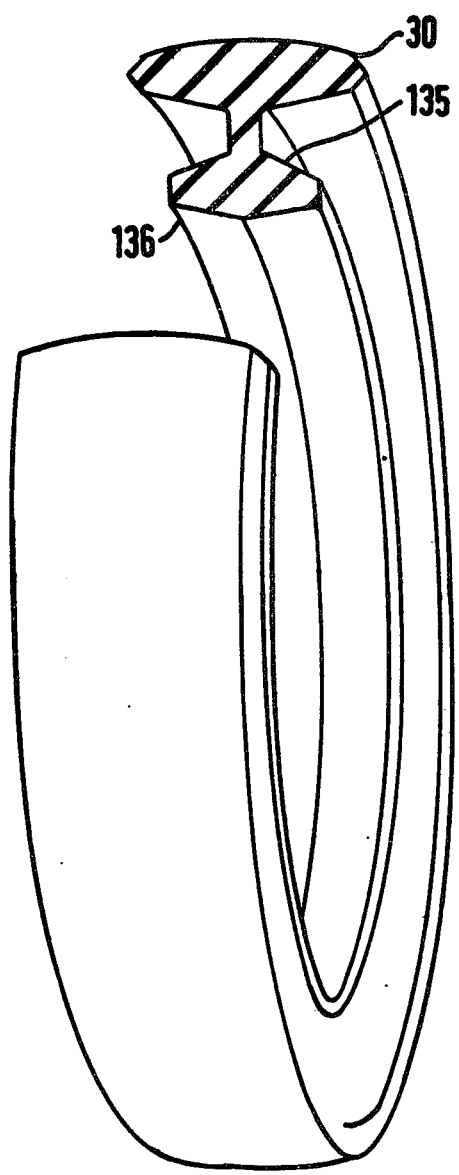
FIG. 6 illustrates a breaker support ring or former used in the press of FIGS. 1 to 3.

In addition to the sidewall die members 17 and 18 the main press includes a two-part intermediate die member 28 which is located for vertical movement by pillars 29 of the main press. When closed, the intermediate die member is dimensioned to receive the annular tread former or breaker support ring illustrated in FIGS. 6 and 7 and form therewith a mould cavity for the tread portion of a pneumatic tire.

Figure 8:
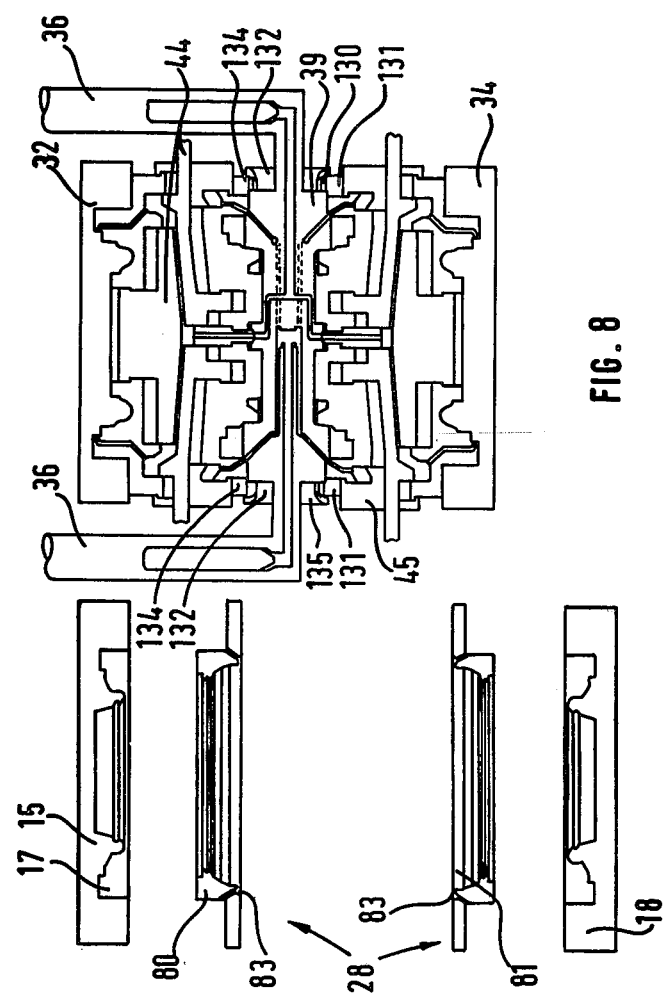
Figure 9:
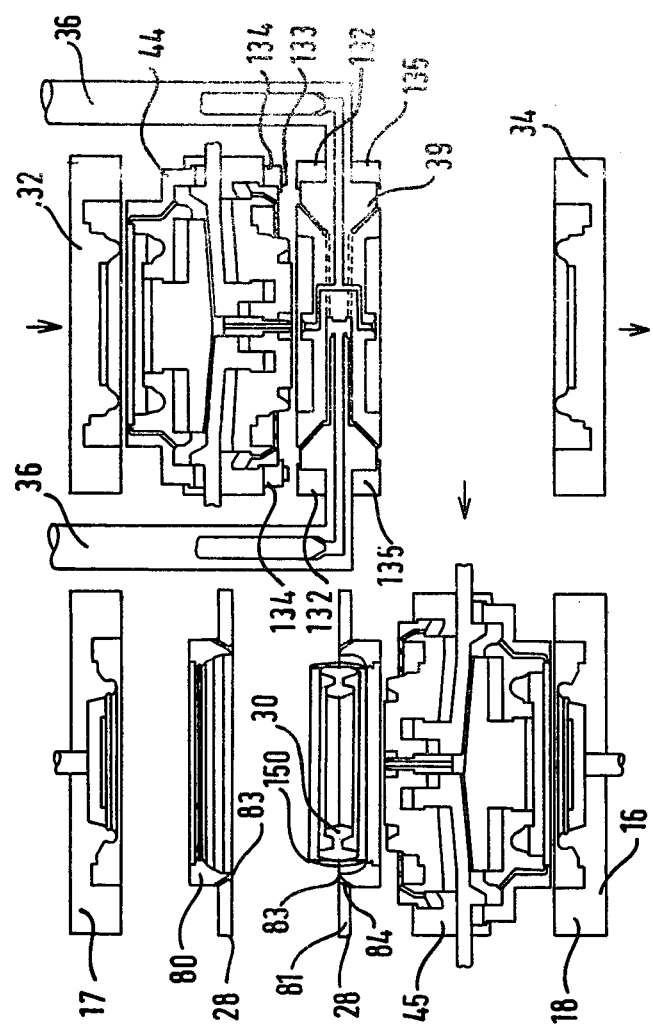

The filling press comprises a fixed upper unit 31 to which a top heat sink 32 is secured and a lower unit 33 to which a bottom heat sink 34 is secured and which is vertically displaceable by an hydraulic clamping ram 35. Two rubber feed screws 36 penetrate the head bolster 12 at the filling press and are connected by respective feed channels 37 and 38 (see FIG. 3) to a distribution plate 39 in a central position in a central position in the filling press. The distribution plate 39 has a normal position (FIG. 9) from which it can be raised (FIG. 8) by the action of the ram 35. The feed screws 36 incorporate sliding seals (not shown) whereby the vertical displacement of the plate 39 can be accommodate without interrupting the feed channels.

Figure 10:
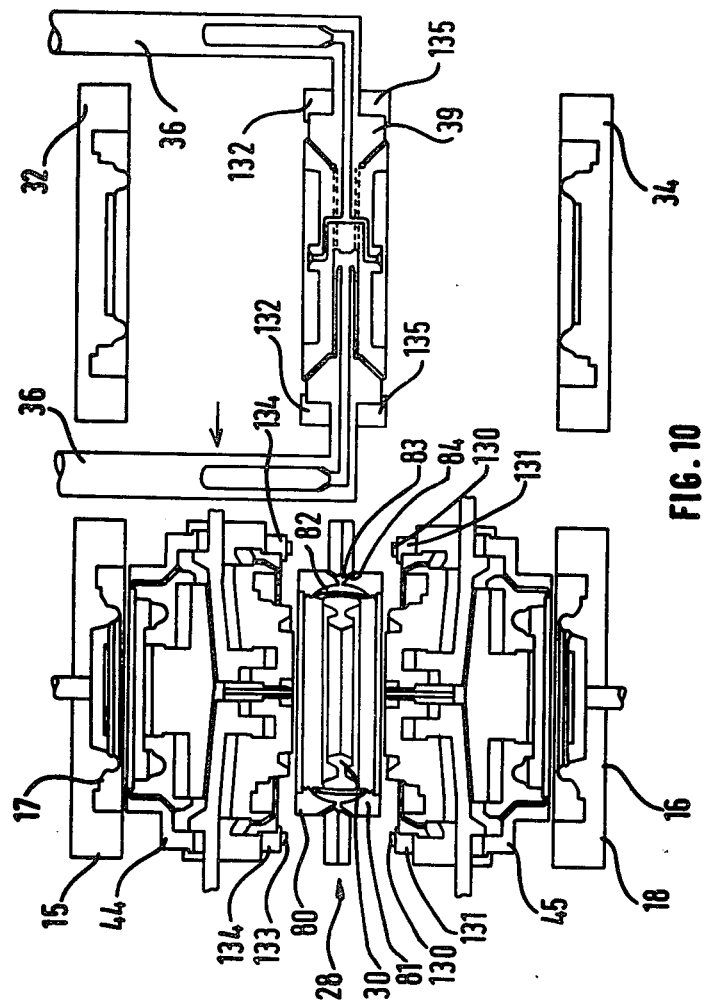
Figure 11:
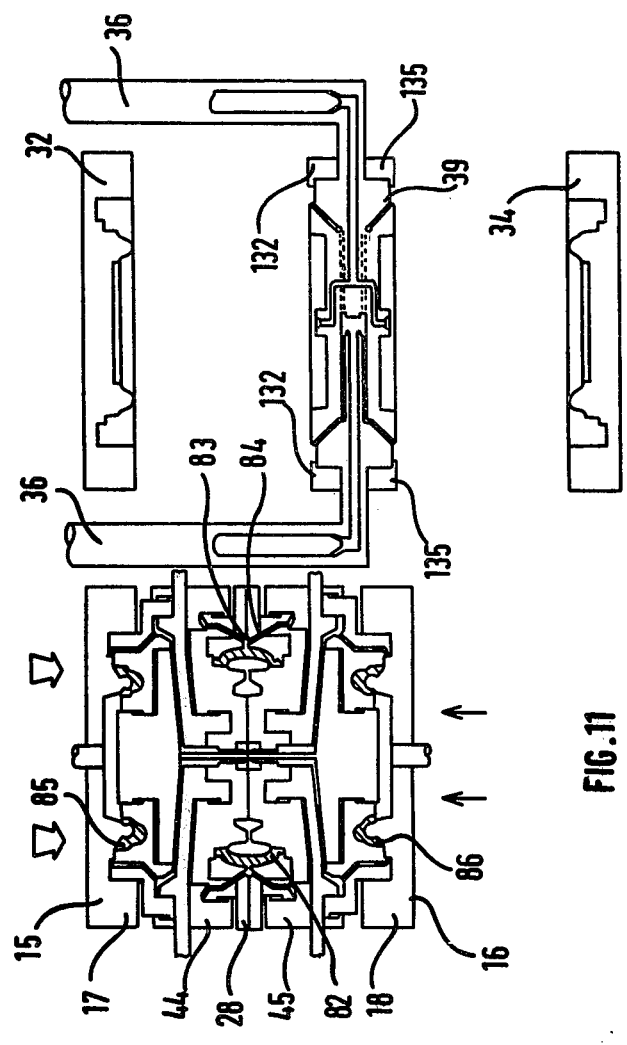

Extending between the main and filling presses are two pairs of horizontally aligned runways 42 and 43 each in the form of a horizontal slide of low friction material. Each slide is engaged by a bracket 40 or 41 forming part of a carriage frame for an associated transfer unit 44 or 45. Suitable drive means is provided for independently displacing each of the transfer units 44 and 45 between an operative position in the main press and an inoperative position in the filling press. The transfer units are shown in the latter position in FIGS. 1, 3 and 8. The drive means may take the form of hydraulic cylinders (not shown) anchored to frame parts of the press fast with the head bolster 12. In the operative positions of the transfer units (FIGS. 10 and 11) the upper unit 44 is between the upper sidewall die member 15 and the intermediate die member 28 and is displaceable therefrom to an inoperative position (FIGS. 8, 9, 12, 13 and 14) in the filling press between the upper heat sink 32 and the distribution plate 39. Independently of the upper transfer unit 44 the lower transfer unit 45 is movable between an inoperative position in the filling press between the lower heat sink 34 and the distribution plate 39 (FIGS. 1-3, 8, 12, 13 and 14) and an operative position in the main press (FIGS. 9–11) between the intermediate die member 28 and the lower sidewall die member 16.

Figure 3:
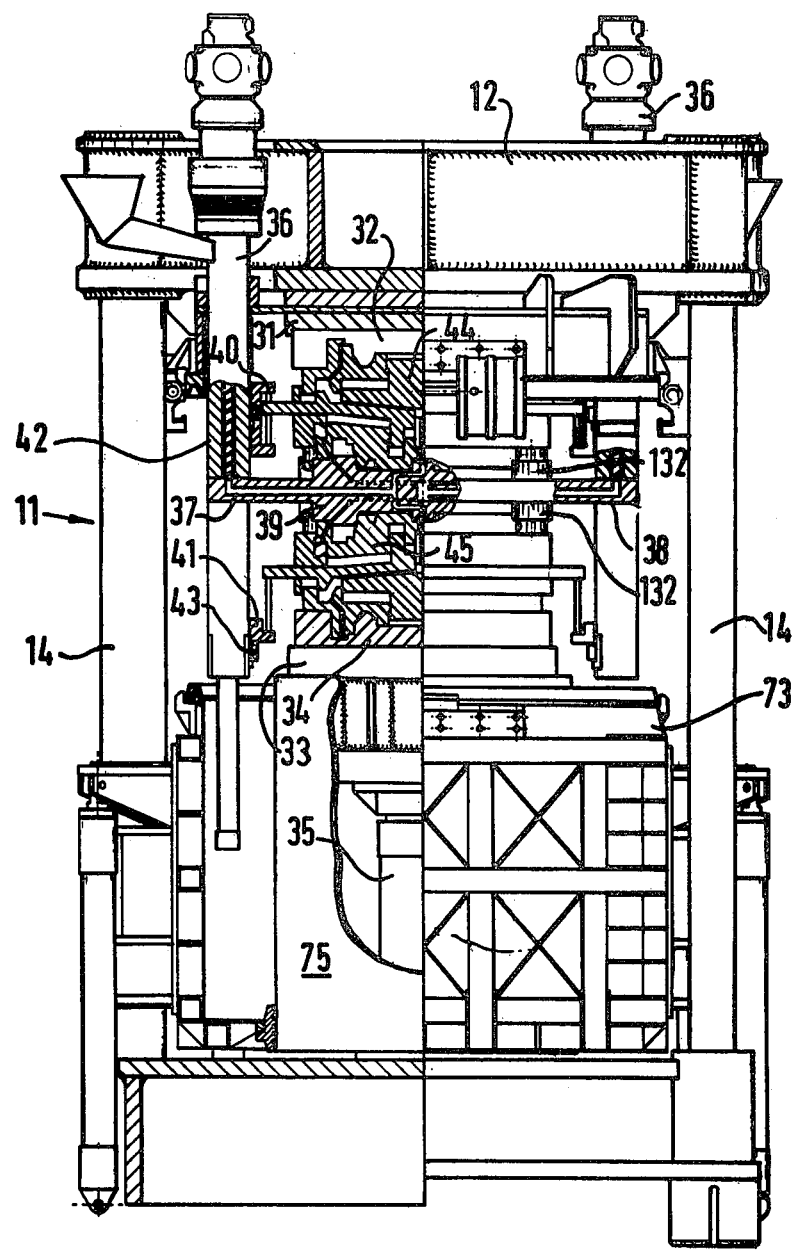
FIG. 3 is a side elevation partly in section, as viewed in the direction taken on the line of arrows III—III of FIG. 1.
Figure 4:
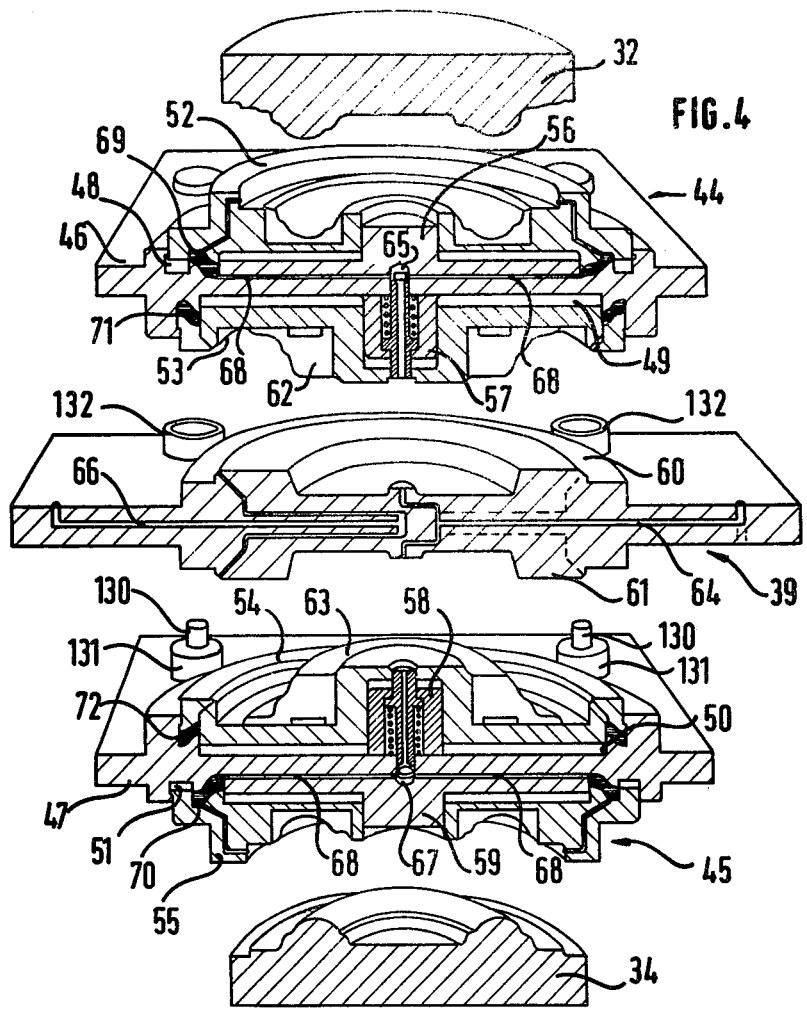
FIG. 4 illustrates in sectional elevation and in perspective the two transfer units of the apparatus of FIGS. 1 to 3, the associated part of the filling press and the associated centering apparatus.

As is more clearly shown in FIG. 4, each transfer unit 44 and 45 is of three part construction including a central plate 46 or 47 in the opposite faces of which annular channels 48, 49, 50 and 51 are formed. In each channel a respective piston plate 52, 53 and 54, 55 is located to be axially displaceable relative to the central plate 46 or 47 and each central plate has oppositely extending central bosses 56, 57 and 58, 59 which locate in corresponding central bores in the piston plate. The distribution plate 39 is formed with central areas 60 and 61 shaped respectively to fit the exposed face 62 of the piston plate 53 and the exposed face 63 of the piston plate 54. Individual channels 64 and 66 in the distribution plate 39 respectively communicate with the screw feeders 36 (see FIG. 3), the passageway 64 branching to the opposite axial faces of the plate 39 at the centres of the formations 60 and 61 and the passageway 66 branching to the opposite faces of the plate 39 nearer to the peripheries of the formations 60 and 61. In this way the downstream ends of the passageway 64 communicate, when the filling press is closed, with central passageways 65 and 67 in the respective transfer units and these in turn communicate via runners 68 in the central plate of each transfer unit with annular reservoir areas or pots 69 and 70 of the transfer units. Similarly the downstream ends of the passageway 66 in the distribution plate communicate with runners in the adjacent parts 53 and 54 of the transfer units which in turn communicate with second pots 71 and 72.

It will be clear that on closure of the filling press by actuation of the ram 35 first the "daylight" between the transfer unit 45 and the distribution plate 39 is taken up and thereafter the "daylight" between the plate 39 and the transfer unit 44. As it is undesirable that contact between some press parts should occur before others, because of the danger of displacement of the contacted parts by those coming into contact, centering apparatus is provided in the form of hydraulic pistons 130 projecting from bosses 131 on the face of the transfer unit 45 presented to the distribution plate 39. Similar pistons 133 and bosses 134 (FIGS. 8-14) are provided on the face of transfer unit 44 presented to the distribution plate 39 and these are arranged to locate in respective collars 132 on the upper face of the plate 39. Similar collars 135 are fixed to the underside of the plate 39 respectively to receive as a sliding fit the bosses 131.

The pistons 130, 133 are normally maintained in a fully extended condition out of the respective bosses 131, 134, as shown, by hydraulic fluid acted upon by pressurized air. As the filling press closes the bosses 131 on the lower transfer unit 45 enter the associated collars, 135 to prevent any subsequent lateral displacement of the unit 45 relative to the distribution plate 39. Air pressure resisting retraction of the pistons 130 into the bosses 131 prevents final closure of the unit 45 and plate 39 until bosses 134 on the unit 44 are also located in the associated collars 132. Continued closure of the filling press after the pistons, 130, 133 of both units 44 and 45 are in contact with the distribution plate 39 will cause simultaneous retraction of all of the pistons 130, 133 into the associated bosses 131, 134 so that during the final closing movement of the filling press not only is lateral displacement of each unit 44 and 45 relative to the plate 39 prevented by location of the bosses 134 in the collars 132 and bosses 131 in the collars 135, but also the resistance to retraction of the pistons 130, 133 ensures that both units come into contact with the distribution plate 65 simultaneously.

The pistons 130 and 133 also contact the upper and lower surfaces of the two-part intermediate die member 28 when the transfer units are positioned in the main press and the main press is closed. The simultaneous final closure of the die member parts 80 and 81 with the transfer units 44 and 45 thus ensured is particularly important to prevent displacement of the breaker structure located between the parts 80 and 81 as described below.

The main and filling presses are jointly surrounded by a rectangular pressure casing or shroud 73 which is vertically displaceable between an open position shown in FIGS. 1 to 3 and a raised, closed position. The pressure casing 73 has sliding seals 200 which form a seal with the cylindrical pressure sealing skirt 23 surrounding the ram 21 of the main press and a similar pressure sealing skirt 75 surrounding the ram 35 of the filling press. The upper periphery of the casing 73 is provided with another pressure seal 76 and in the raised position of the casing 73 this abuts a flange 77 surrounding the main and filling presses at the periphery of a top part 201 of the casing fast with the head bolster 12. Suitable ram operated locking means 78 is provided for locking the casing 73 in its raised positon with the seal 76 in engagement with the flange 77. The head bolster 12, flange 77, pressure casing 73 and skirts 23 and 75 provide an openable enclosure for the main and filling presses permitting them to be pressurised.

A super-atmospheric pressure is provided in the closed casing 73 by a compressor (not shown) to prevent "gassing-off" of the worn rubber and to hold the moulded tire parts in position on the dies. The screw feeders 36, the distribution plate 39 and the heat sinks 32 and 34 are provided with distribution channels (not shown) for a heating or cooling fluid medium for controlling the rate of cure of the rubber.

The operation of the press illustrated in FIGS. 1 to 3 will now be described with reference to FIGS. 8 to 14.

With the pressure casing 73 lowered and the transfer units 44 and 45 in their inoperative positions in the filling press the ram 35 is operated to close the filling press and uncured rubber introduced through feed passages 37 and 38 (FIG. 3) is driven by the screw feeders 36 through the passageways 64 and 66 in the distribution plate 39 and the registering passageways in the transfer units into the two annular pots 69, 70 and 71, 72 of the transfer units (FIG. 4). In this way a measured quantity of uncured rubber is introduced into each pot, a different compound from a different one of the screw feeders 36 reaching the respective pots of each transfer unit.

On completion of the charging of both transfer units the ram 35 is retracting and lower transfer unit 45 is moved from the filling press to the main press (FIG. 9) the pressure casing 73 remaining open so that an operator standing on a platform adjacent the main press (not shown) has access to the intermediate die member 28. The two component parts 80 and 81 of the intermediate die member 28 are at this time separated and non-rubber components of the tire, including a breaker structure 150 mounted on a deformable breaker support ring 30 are located by the operator between the two parts 80 and 81 of the intermediate die member, the assembly 150, 30 resting on the lower part 81 of the intermediate die member. When located in the press the breaker support ring 30 may already have mounted on it the breaker structure 150 for the tire and may be expanded within the press to stress the breaker structure 150 all as described the assignee's co-pending Patent Application Ser. No. 579,424 of May 21, 1975, now U.S. Pat. No. 5,997,878. To improve its deformability the radially inner portion 135 of the breaker support ring may be axially slotted as shown at 136 in FIG. 6. As also described in the said provisional specification the breaker structure may have edge portions tucked into inflatable pockets (not shown) of the former and means (not shown) may be provided for inflating these pockets at a later stage of the process to engage the breaker structure 150 against the tire sidewalls. With the breaker structure on the former 30 mounted within the intermediate die member 28 its two parts 80 and 81 are closed (FIG. 10) so as to define with the former 30 an annular mould cavity 82 for the tread portion of a pneumatic tire. As described in the Assignee's co-pending patent application Ser. No. 581,587 of May 28, 1975 the cavity 82 communicates with a surrounding pot 83 defined between the two parts of the intermediate die member 28 and the pot 83 communicates with the external surfaces of the closed intermediate die member by runners 84.

Figure 5:
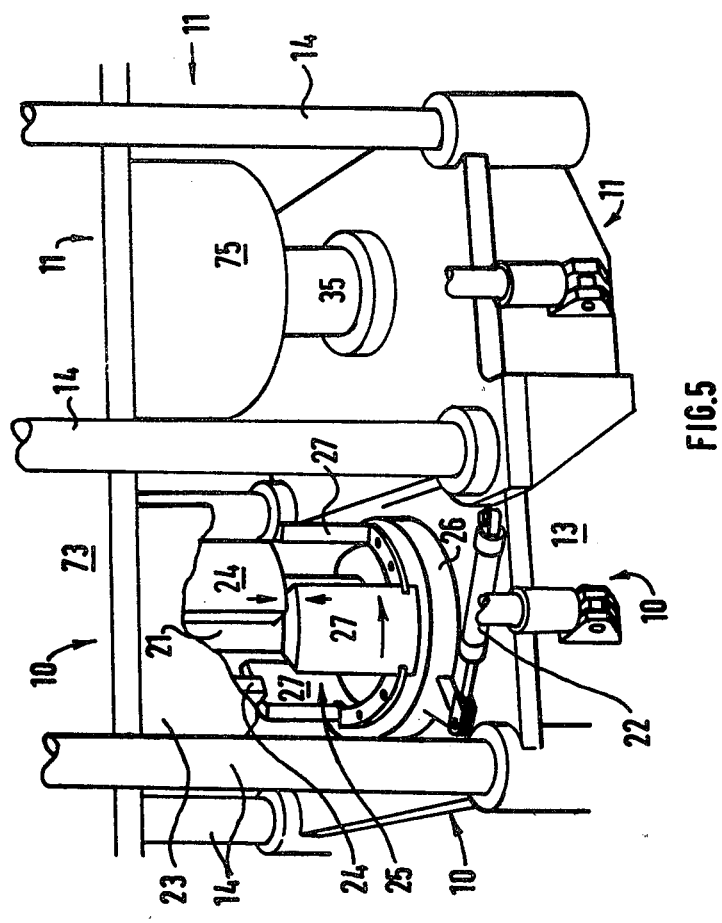
FIG. 5 is a perspective view of the bottom part of the apparatus of FIGS. 1-3.

The upper transfer unit 44 is now moved into the main press above the closed intermediate die member, the pressure casing 73 is raised and locked and pressurized air is introduced into the closed casing 73. The ram 21 is operated to close up the daylight of the main press, raising the lower transfer unit 45 and the intermediate die member 28 against the upper transfer unit 44 and with the ram 21 extended the ram 22 is actuated to rotate the crown member 26, thus preventing re-lowering of the members of the main press. This is shown in FIG. 5. The ram 19 of the main press is now operated (FIG. 11) to exert a downward pressure on the upper sidewall die member 17 which is transmitted to the transfer units 44 and 45 and reacts against the lower sidewall die member 18 which is prevented from descending by the crown member 27. The pressure applied to the transfer units 44 and 45 by the main press ram 19 has the effect of displacing the piston plates 52, 53 and 54, 55 of the transfer units inwardly of the respective center plates 46 and 47 so that the dimensions of the pots 69, 70, 71 and 72 are reduced. By this means a first rubber compound is displaced from the pots 69 and 70 (FIG. 4) into sidewall mould cavities 85 and 86 defined between the exposed surface of the piston plate 52 of the transfer unit 44 and the upper sidewall die member 17 of the press and between the piston plate 55 of the transfer unit 45 and the lower sidewall die member 18 of the main press and into the locking spue grooves (not shown) adjacent and opening to these cavities. At the same time a second rubber compound is displaced from the pots 71 and 72 through the runners 84 of the intermediate die member which are now in register with runners of the piston plates 53 and 54 of the transfer units into the annular pot 83 and thence into the mould cavity 82.

Full pressure is maintained for a predetermined period to effect a partial cure of the compounds in their respective cavities and thereafter pressure applied by the main ram 19 is relieved.

The ram 21 is now re-actuated to lift the load blocks 24 clear of the teeth of the crown member 26 (see FIG. 5) whereupon the ram 22 is actuated to rotate the crown member unitl the teeth 27 are aligned with the gaps between the load blocks 24. The ram 21 is now retracted fully to open the main press. Because of their locking spues the moulded tire sidewalls 100 and 101 are not dislodged from their moulded positions on the main press sidewall die members 17 and 18 and the moulded tire tread portion 102 remains in the mould cavity between the two parts of the intermediate die member 28. A tread-forming pattern on the intermediate die member assists in retaining the tread portion thereon.

Figure 12:
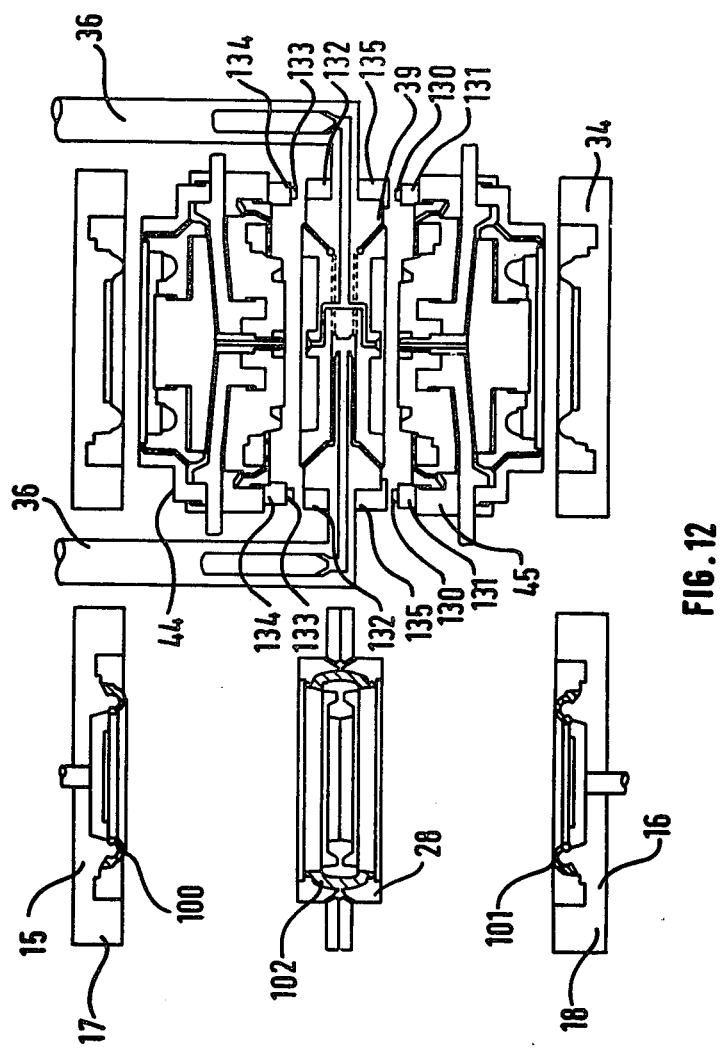
Figure 13:
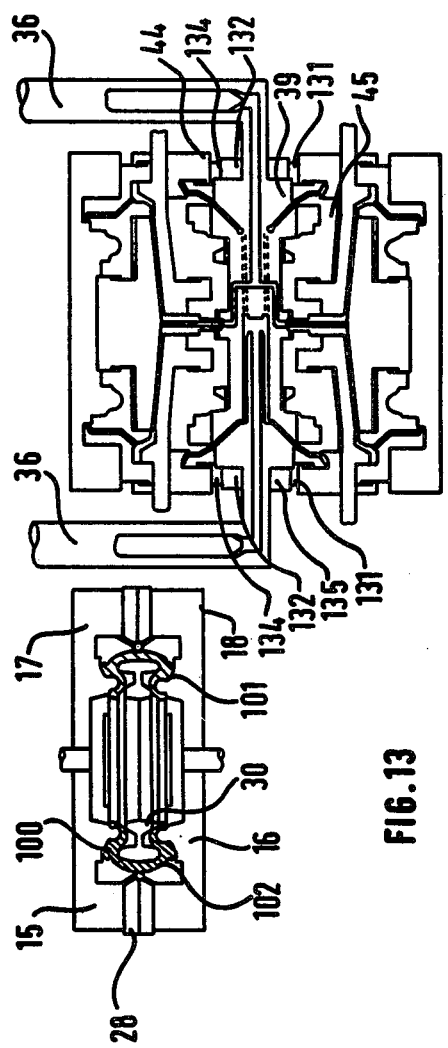

With the transfer units 44 and 45 clear of the die members 17, 18 and 28 of the main press they are both moved from the main press to the filling press (FIG. 12). It is to be appreciated that all this time the pressure casing 73 remains closed and pressurized and thus assists in retaining the three, annular moulded tire portions 100, 101 and 102 in position on the respective die members. With the transfer units clear of the main press the ram 21 is now fully extended above the teeth of the crown member until the radially outer ends of the tire sidewalls 100 and 101 are brought into contact with the opposite axial ends of the tread 102 by the sidewall die members 17 and 18 of the main press abutting opposite sides of the intermediate die member 28 (FIG. 13). This produces a fully assembled pneumatic tire although subsequent operations may be performed to join the breaker structure 150 surrounding the former 30 and now embedded in the tread 102 of the tire with any sidewall reinforcing plies which may have been provided, e.g. by inflating pockets (not shown) in the former 30 to displace the breaker edges into contact with the tire sidewalls as described in the provisional specification of the Assignee's previously mentioned co-pending patent application Ser. No. 579,424.

The closed casing 73 is now gradually depressurized by opening a relief valve (not shown) during a predetermined cure period for the finished tire, during which pressure on the main press die members 17, 18 and 28 is maintained by the rams 19 and 21.

Figure 14:
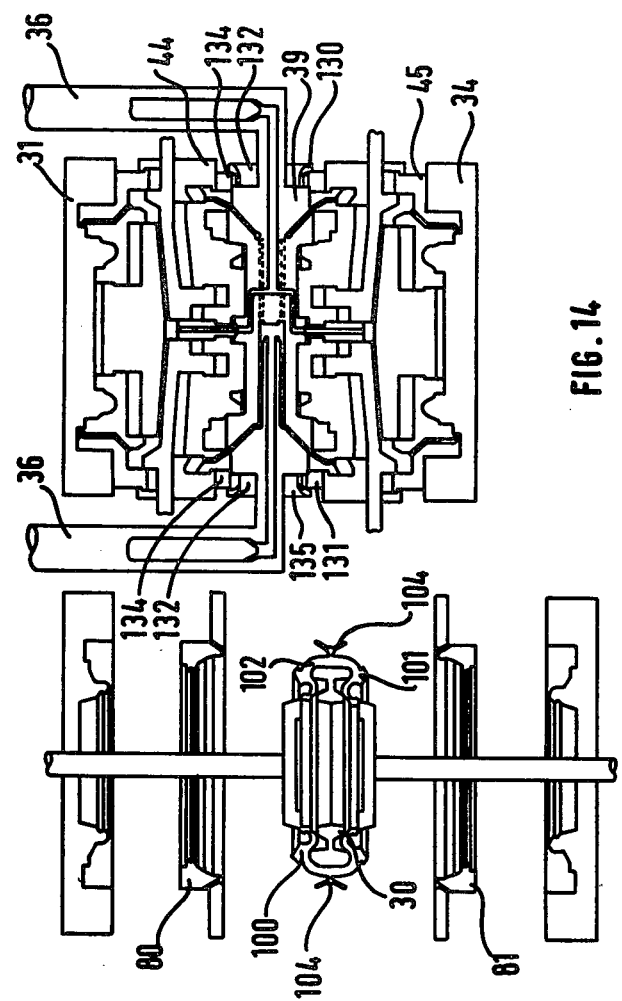

At the end of the full cure cycle, the casing 73 having been fully depressurized, the ram 19 is de-actuated and the upper die member 17 raised by the pull back rams 20. At the same time the ram 21 is retracted to lower the bottom main press die member 18, the sidewalls 100 and 101 of the finished tire separating from the die members 17 and 18 because of their bonding to the tread portion 102 of the tire and the locking spues on the sidewalls being dislodged from their associated recesses in the sidewall die members 17 and 18 because of the superior strength of the bond between the sidewalls and tread portion of the finished tire (FIG. 14). The two parts 80 and 81 of the intermediate die member 28 are vertically separated to expose the finished tire and the depressurized casing 73 is lowered to provide access by the operator to the interior of the main press.

With the main press fully open, the casing 73 fully lowered and the two parts 80 and 81 of the intermediate die member 28 fully separated the operator can remove the finished tire from the press with the deformable breaker support ring 30 within it. It then remains to trim off the locking spues and the annular spue 104 produced by the annular pot 83 of the intermediate die member 28 and the associated runners of the intermediate die member and to pull the deformable breaker support ring 30 out of the finished tire as described in patent application Ser. No. 579,424. During removal of the finished tire from the main press the ram 35 of the filling press is actuated to engage the transfer units 44 and 45 with the heat sinks 31 and 34 and with opposite sides of the distribution plate 39 to recommence the cycle of operations already described for the manufacture of a second tire.

Although in the preferred embodiment of the invention above described the tire-forming process is carried out under super-atmospheric pressure this is not essential to the invention. It is contemplated that by using suitable rubber mixture under suitable temperature conditions the pressure casing 73 and associated skirts 21 and 75 could be dispensed with.

Also although in the preferred embodiment of the invention above described rubber for the sidewalls and the tread of the tire is introduced into the transfer unit at the filling press it is contemplated that the transfer units should be charged at the filling press only with rubber for the sidewalls, or alternatively only with rubber for the tire tread portion, and that rubber for the tread portion of the tire, or alternatively for the sidewalls, should be introduced directly to the appropriate components of the main press. For example, if the tread portion rubber is introduced directly by a screw-feeder (not shown) to the intermediate die member 28 of the main press each of its components 80 and 81 will comprise relatively axially movable parts defining an annular pot therebetween communicating via suitable runners with the cavity 82 on the one hand and with a screw-feeder on the other hand.

Alternatively the die members 17 and 18 of the main press may be of two-part construction defining an annular pot therebetween which communicates via runners on the one hand with the sidewall-cavity-defining surfaces 85 and 86 of the die members 17 and 18 and on the other hand with a screw-feeder for rubber compound.

In either of these alternative arrangements rubber compound will be introduced into the charging cavity or pot between the part of the main press by the associated screw-feeder and thereafter on closure of the main press the measured rubber compound will be displaced from the pot or pots into the tire-forming cavity or cavities defined between main press parts and the transfer units located therein.

Having now described my invention — what I claim is:

1. A method of moulding a pneumatic tire having sidewalls joined by a tread portion the method comprising:

locating at a filling station two transfer units, each unit comprising in its face remote from the other transfer unit a mould surface for one of the sidewalls, each unit comprising at least two parts relatively movable axially of the unit between an open position in which the volume of at least one reservoir for uncured rubber defined between said parts is relatively large and a closed position in which said volume is relatively small, and passageway means communicating the axially opposite faces of each unit with a reservoir thereof, charging the reservoirs of the transfer units with moulding material at the filling station, opening a press so that sidewall die members thereof are relatively spaced, the faces of the sidewall die members presented toward one another comprising mould surfaces for the sidewalls and locking spue grooves adjacent the mould surfaces, locating the transfer units in the press so they are positioned between the sidewall die members with the sidewall mould surfaces of the transfer units presented towards the mould surfaces of the sidewall die members, closing the press whereby a mould cavity for the tread portion is defined between the transfer unit and a mould cavity and locking spue groove for one of the sidewalls is defined between each sidewall die member and the mould surface of the adjacent transfer unit, each said cavity communicating with a passageway of at least one of the transfer units, applying pressure to the closed press relatively to move the parts of each transfer unit to the closed positions thereof whereby moulding material is transferred from the reservoirs to the cavities via the passageways, re-opening the press and removing the transfer units therefrom, the moulded tread portion remaining in the press and the moulded sidewalls being held on the respective sidewall die members by the moulded locking spues and re-closing the press to bring the moulded sidewalls, held by the locking spues, into contact with the moulded tread portion on opposite sides of the latter and bonding the sidewalls to the tread portion, the method additionally comprising subjecting the moulding components of the press to super-atmospheric pressure during the moulding operation and subsequent bonding operation.

* * * * *